(12) United States Patent
Yoshida et al.

(10) Patent No.: US 9,094,547 B2
(45) Date of Patent: Jul. 28, 2015

(54) IMAGE FORMING APPARATUS DISPLAYING INFORMATION THAT IS RECEIVED FROM AN EXTERNAL DEVICE AND IS DIRECTED TO A USER

(75) Inventors: Daisuke Yoshida, Osaka (JP); Yasushi Tsukamoto, Osaka (JP); Tetsuya Nishino, Osaka (JP); Keisaku Matsumae, Osaka (JP)

(73) Assignee: KYOCERA Document Solutions Inc. (JP)

( * ) Notice: Subject to any disclaimer, the term of this patent is extended or adjusted under 35 U.S.C. 154(b) by 484 days.

(21) Appl. No.: 13/482,763

(22) Filed: May 29, 2012

(65) Prior Publication Data

US 2012/0307279 A1 Dec. 6, 2012

(30) Foreign Application Priority Data

| May 30, 2011 | (JP) | ................ | 2011-121031 |
| May 30, 2011 | (JP) | ................ | 2011-121033 |
| May 30, 2011 | (JP) | ................ | 2011-121036 |
| Jun. 29, 2011 | (JP) | ................ | 2011-144174 |
| Jun. 29, 2011 | (JP) | ................ | 2011-144179 |

(51) Int. Cl.
*H04N 1/00* (2006.01)

(52) U.S. Cl.
CPC ....... *H04N 1/00244* (2013.01); *H04N 1/00411* (2013.01); *H04N 1/00472* (2013.01); *H04N 1/00474* (2013.01); *H04N 1/00477* (2013.01)

(58) Field of Classification Search
None
See application file for complete search history.

(56) References Cited

U.S. PATENT DOCUMENTS

| 5,365,310 | A  | * | 11/1994 | Jenkins et al. | ............ | 399/8 |
| 7,769,307 | B2 | * | 8/2010 | Oya | ............ | 399/24 |
| 7,885,552 | B2 | * | 2/2011 | Kim | ............ | 399/8 |
| 2001/0029521 | A1 | | 10/2001 | Matsuda et al. | | |
| 2002/0054340 | A1 | * | 5/2002 | Tokutomi et al. | ............ | 358/1.15 |
| 2002/0066097 | A1 | | 5/2002 | Hattori et al. | | |
| 2006/0271936 | A1 | | 11/2006 | Matsuda et al. | | |
| 2007/0188791 | A1 | * | 8/2007 | Utsunomiya et al. | ......... | 358/1.13 |
| 2008/0267642 | A1 | * | 10/2008 | Hadano | ............ | 399/27 |
| 2008/0278748 | A1 | * | 11/2008 | Akahane et al. | ............ | 358/1.15 |
| 2008/0297845 | A1 | * | 12/2008 | Sakamoto | ............ | 358/1.15 |
| 2009/0086269 | A1 | | 4/2009 | Nakajima | | |
| 2009/0135446 | A1 | | 5/2009 | Kawabuchi et al. | | |
| 2009/0174894 | A1 | | 7/2009 | Kamijo | | |
| 2010/0002251 | A1 | * | 1/2010 | Tachibana | ............ | 358/1.15 |
| 2010/0005462 | A1 | | 1/2010 | Ookuma | | |
| 2010/0073720 | A1 | | 3/2010 | Wakui et al. | | |

(Continued)

FOREIGN PATENT DOCUMENTS

| JP | 10-301451 A | 11/1998 |
| JP | 11-015768 A | 1/1999 |

(Continued)

*Primary Examiner* — Hilina K Demeter

(74) *Attorney, Agent, or Firm* — McDonnell Boehnen Hulbert & Berghoff LLP

(57) ABSTRACT

An image forming apparatus includes a display device, an operation device, an information-for-display reception unit, and a display control unit. The display device displays information for display. The operation device is receives input of an operation by a user. The information-for-display reception unit receives the information for display from an external device. The display control unit controls the display device, and causes the display device to display the information for display when the information for display received by the information-for-display reception unit is directed to the user.

18 Claims, 21 Drawing Sheets

(56) References Cited

U.S. PATENT DOCUMENTS

| | | |
|---|---|---|
| 2010/0231950 A1* | 9/2010 | Sawayanagi et al. ........ 358/1.14 |
| 2011/0043843 A1 | 2/2011 | Nishiyama |
| 2011/0134475 A1* | 6/2011 | Ooba ........................... 358/1.15 |
| 2011/0157627 A1* | 6/2011 | Ishimoto ...................... 358/1.15 |
| 2011/0157638 A1* | 6/2011 | Yamada ....................... 358/1.15 |
| 2011/0181902 A1* | 7/2011 | Chiba et al. ................. 358/1.13 |
| 2011/0242592 A1* | 10/2011 | Tamura ........................ 358/1.15 |
| 2012/0300257 A1 | 11/2012 | Nakajima |
| 2013/0271784 A1 | 10/2013 | Nakajima |

FOREIGN PATENT DOCUMENTS

| | | |
|---|---|---|
| JP | 11-249781 | 9/1999 |
| JP | 2001-358877 | 12/2001 |
| JP | 2002-007095 A | 1/2002 |
| JP | 2003-187124 A | 7/2003 |
| JP | 2004-345161 | 12/2004 |
| JP | 2005-182445 A | 7/2005 |
| JP | 2006-350497 A | 12/2006 |
| JP | 2007-119104 A | 5/2007 |
| JP | 2008-227914 A | 9/2008 |
| JP | 2009-086805 A | 4/2009 |
| JP | 2009-130829 A | 6/2009 |
| JP | 2010-015268 A | 1/2010 |
| JP | 2010-074683 A | 4/2010 |
| JP | 2010-086481 A | 4/2010 |
| JP | 2011-044779 A | 3/2011 |
| JP | 2011-103146 A | 5/2011 |

* cited by examiner

US 9,094,547 B2

IMAGE FORMING APPARATUS DISPLAYING INFORMATION THAT IS RECEIVED FROM AN EXTERNAL DEVICE AND IS DIRECTED TO A USER

INCORPORATION BY REFERENCE

This application is based upon, and claims the benefit of priority from, corresponding Japanese Patent Application Nos. 2011-121031, 2011-121033, and 2011-121036 filed in the Japan Patent Office on May 30, 2011, Nos. 2011-144174 and 2011-144179 filed in the Japan Patent Office on Jun. 29, 2011, the entire contents of each which are incorporated herein by reference.

BACKGROUND

1. Field

The present invention relates to an image forming apparatus including a display device displaying information that is received from an external device and is directed to a user.

2. Description of the Related Art

Image forming apparatuses such as a multi function peripherals (MFPs) that display information received from an external device are disclosed.

A typical first image forming apparatus is connected to a personal computer (PC), stores an inherent message and a user-defined message created by the user on the PC, and if there is a display request for a message, displays one of the inherent message and the user-defined message.

A typical second image forming apparatus is connected to the PC, and displays a message for calling attention to a toner saving function and a message for informing of a timing for maintenance, which are created by the user on the PC.

A typical third image forming apparatus is connected to the PC, and displays schedule information such as an invitation to a meeting, information on left messages, and messages such as a weather forecast, which are created by the user on the PC.

The above-described typical first, second, and third image forming apparatuses display the same information to all users, but cannot display information directed to a specified user.

SUMMARY

The present disclosure relates to an image forming apparatus that displays information directed to a specified user which is received from an external device.

According to the present disclosure, an image forming apparatus includes a display device, an operation device, an information-for-display reception unit, and a display control unit. The display device displays information for display. The operation device receives input of an operation by a user. The information-for-display reception unit receives the information for display from an external device. The display control unit controls the display device, and causes the display device to display the information for display when the information for display received by the information-for-display reception unit is directed to the user.

DETAILED DESCRIPTION

Described first is a configuration of a network system according to the present disclosure.

Figure 1:
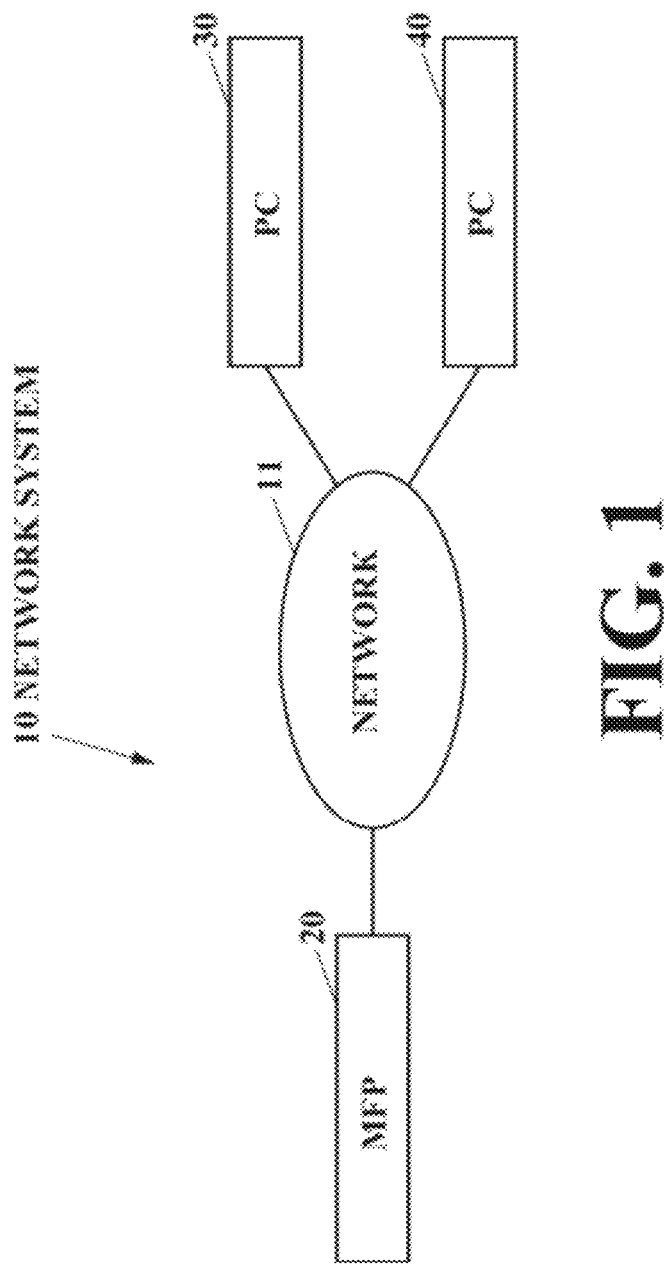
FIG. 1 is a block diagram illustrating a configuration of a network system according to the present disclosure.

FIG. 1 is a block diagram illustrating the configuration of a network system 10 according to the present disclosure.

As illustrated in FIG. 1, the network system 10 includes a multi function peripheral (MFP) 20, which is an image forming apparatus, and personal computers (PCs) 30 and 40 serving as external devices. The MFP 20 and the PCs 30 and 40 are communicably connected to each other via a local area network (LAN) or a network 11 such as the Internet. Note that FIG. 1 illustrates only the MFP 20, the PC 30, and the PC 40, but two or more MFPs or three or more PCs may be provided. Further, the image forming apparatus according to this embodiment is the MFP, but in other embodiments may be an image forming apparatus other than the MFP, such as a standalone printer. Further, the external device according to this embodiment is the PC, but in other embodiments may be a device other than the PC.

Figure 2:
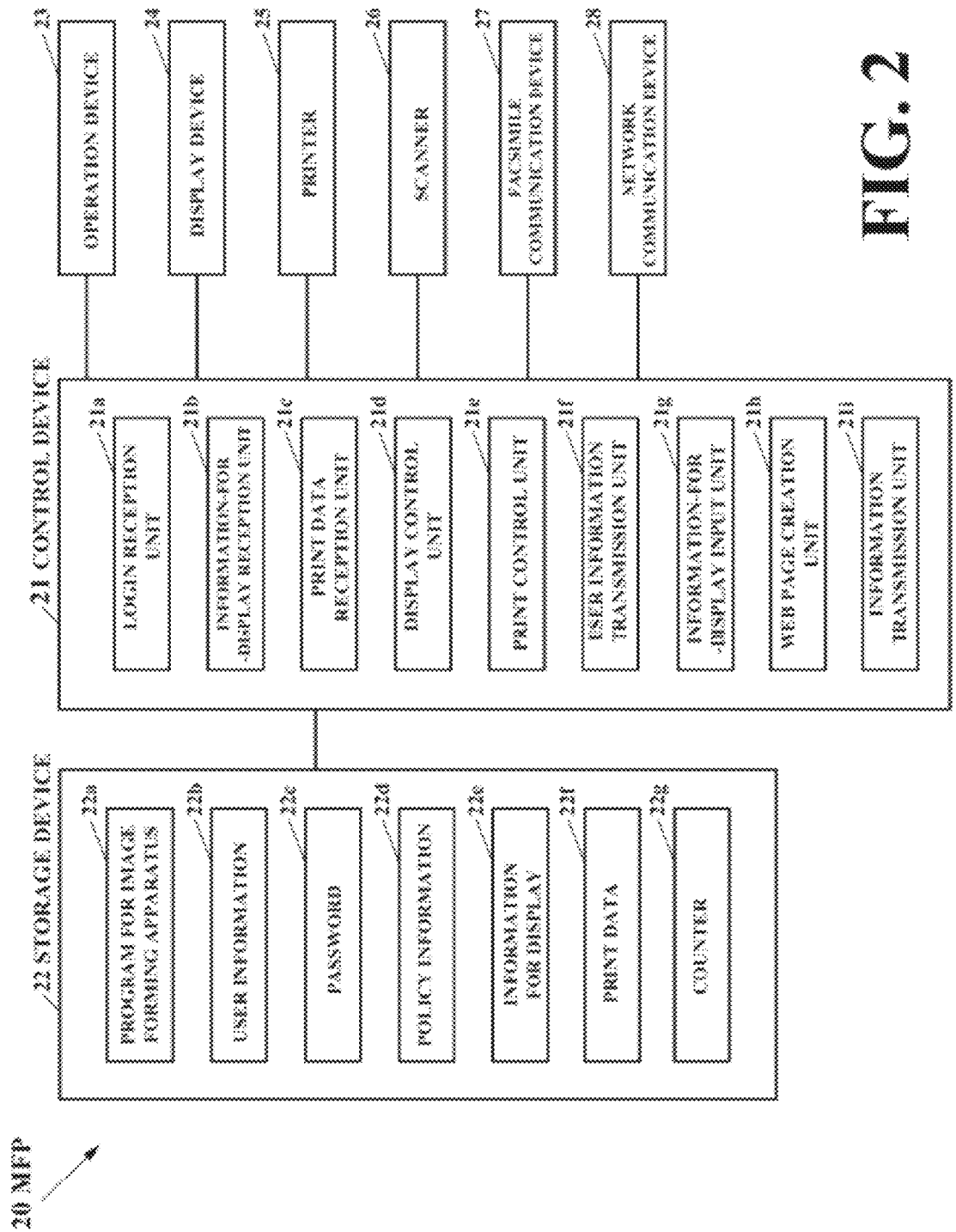
FIG. 2 is a block diagram illustrating a configuration of an MFP included in the network system.

FIG. 2 is a block diagram illustrating a configuration of the MFP 20 included in the network system.

The MFP 20 includes a control device 21 that controls the entire MFP 20, a storage device 22 that stores various kinds of data such as electrically erasable programmable read only memory (EEPROM), an operation device 23 such as buttons via which various kinds of operations are input by a user, a display device 24 such as a liquid crystal display (LCD) that displays various kinds of information, a printer 25 that performs a print process on paper, a scanner 26 that reads an image from an original, a facsimile communication device 27 that performs facsimile communications to/from an external facsimile machine (not illustrated) via a communication line such as a public telephone line, and a network communication device 28 that communicates with the external device via the network 11.

The control device 21 includes, for example, a central processing unit (CPU), a read only memory (ROM) that previously stores a program and various kinds of data, and a random access memory (RAM) used as a work area of the CPU. The CPU performs the program stored in the ROM or the storage device 22.

The storage device 22 stores a program 22a for the image forming apparatus, user information 22b that is identification information on the user, a password 22c used for login by the user, and policy information 22d that defines a policy of the user. Note that the user information 22b, the password 22c, and the policy information 22d are stored in the storage device 22 for each user. Further, the storage device 22 may store information 22e for display on the display device 24 of the MFP 20 and the print data 22f to be printed by the printer 25. The information 22e for display may be displayed on a web browser of the external device such as the PC 30 or 40. The information 22e for display may be, for example, an arbitrary message such as: "Due to rolling blackouts scheduled today, the power supply to the MFP will be shut down at half past two."

Note that the program 22a for the image forming apparatus may be installed on the MFP 20 when the MFP 20 is manufactured, or may be additionally installed on the MFP 20 from a storage medium such as a compact disk (CD) or a digital versatile disk (DVD) or via the network 11.

The control device 21 performs the program 22a for the image forming apparatus stored in the storage device 22 so as to function as (i) a login reception unit 21a that receives a login of the user via the operation device 23 or the web browser of the external device such as the PC 30 or 40, (ii) an information-for-display reception unit 21b that receives the information 22e for display from the PC 30, (iii) a print data reception unit 21c that receives the print data 22f from the PC 30, (iv) a display control unit 21d that controls a display process performed by the display device 24, (v) a print control unit 21e that controls a print process performed by the printer 25, and (vi) a user information transmission unit 21f that transmits to the PC 30 the user information 22b on the user whose login has been received by the login reception unit 21a.

Further, the control device 21 may function as (i) an information-for-display input unit 21g via which the information 22e for display is input and (ii) a web page creation unit 21h that creates a web page (that includes the information 22e for display input via the information-for-display input unit 21g) in response to a request received from the web browser of the external device such as the PC 30 or 40.

In addition, the control device 21 may function as an information transmission unit 21i that transmits, to the external device, service request information including information for requesting a service person, order placement information including information on order placement of a consumable, and other such information.

Figure 3:
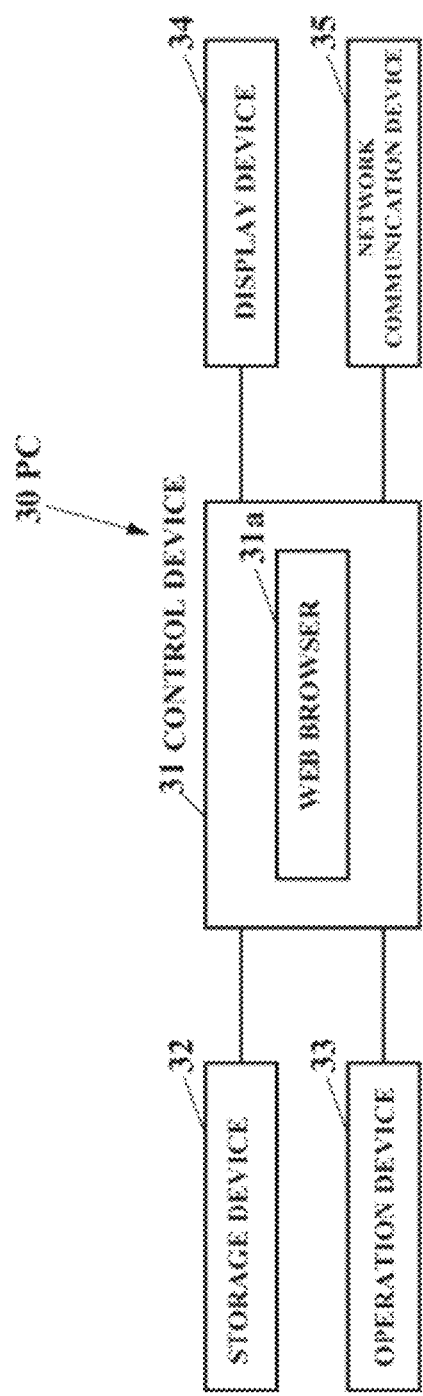
FIG. 3 is a block diagram illustrating a configuration of a PC included in the network system.

FIG. 3 is a block diagram illustrating a configuration of the PC 30 included in the network system. Note that the PC 30 and the PC 40 have the same or similar configuration.

The PC 30 includes a control device 31 that controls the entire PC 30, a storage device 32 such as a hard disk drive (HDD) that stores a program and various kinds of data, an operation device 33 such as a mouse and a keyboard via which various kinds of operations are input by the user, a display device 34 such as an LCD that displays various kinds of information, and a network communication device 35 that communicates with the external device via the network 11.

The control device 31 includes, for example, a CPU, a ROM that stores a program and various kinds of data, and a RAM used as a work area of the CPU. The CPU performs the program stored in the ROM or the storage device 32.

The control device 31 may perform the program stored in the storage device 32 so as to function as a web browser 31a that displays the web page on the display device 34 in response to an operation input via the operation device 33.

In first to fourth embodiments described below, the control device 31 of the PC 30 may perform transmission/reception of information to/from the MFP 20, for example, via the web browser displayed on the display device 34. Note that the control device 31 may perform the transmission/reception of information to/from the MFP 20 by a method other than the web browser.

(First Embodiment)

The login reception unit 21a of the control device 21 of the MFP 20 (i) performs authentication when the user information 22b and the password 22c, which are previously registered in the storage device 22, are input via the operation device 23, and (ii) receives the login to the MFP of the user corresponding to the user information 22b.

Figure 4:
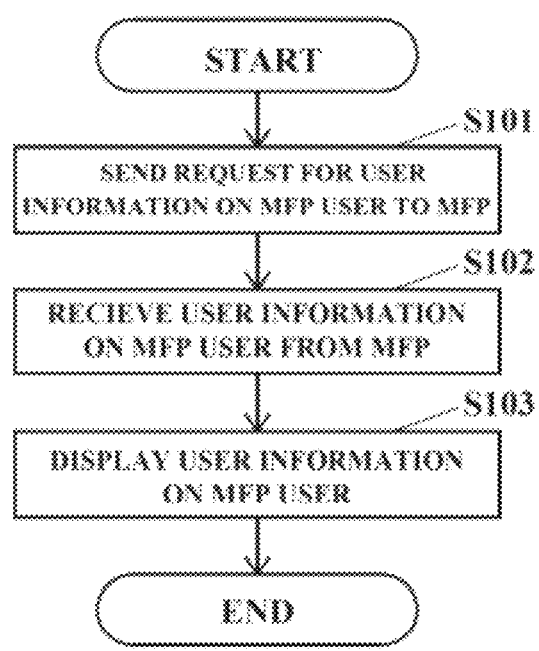
FIG. 4 is a flowchart illustrating an operation performed by the PC when requesting the MFP for user information on a user who has logged in to the MFP according to a first embodiment.

FIG. 4 is a flowchart illustrating an operation performed by the PC 30 when requesting from the MFP 20 the user information 22b on the user who has logged in to the MFP (hereinafter, referred to as "MFP user").

The control device 31 of the PC 30 performs the process illustrated in FIG. 4 when the user of the PC 30 (hereinafter, referred to as "PC user") requests from the MFP 20 the user information 22b on the MFP user via the operation device 33.

The control device 31 sends a request for the user information 22b on the MFP user to the MFP 20 via the network communication device 35 (S101).

When the request for the user information 22b on the MFP user is received from the PC 30 via the network communication device 28, the user information transmission unit 21f of the control device 21 of the MFP 20 transmits the user information 22b on the MFP user.

The control device 31 of the PC 30 receives the user information 22b (S102), displays the user information 22b on the display device 34 (S103), and brings the process illustrated in FIG. 4 to an end.

Therefore, the PC user recognizes the MFP user based on the user information 22b displayed on the display device 34.

Note that, in the same manner as the user information 22b on the MFP user, the PC user may recognize setting information on the MFP 20 and state information on the MFP 20 other than the user information 22b by receiving this information from the MFP 20 and displaying this information on the display device 34. In this case, the setting information includes attribute information set in the MFP 20 such as a paper size of a tray of the MFP 20. The state information includes status information indicating a state of the MFP 20 such as a state during the print process.

The PC user who has recognized the MFP user inputs the information 22e for display directed to the MFP user via the operation device 33, and inputs an instruction to transmit the information 22e for display to the MFP 20 via the operation device 33.

When the instruction is input, the control device 31 of the PC 30 associates the user information 22b on the MFP user with the information 22e for display, and then transmits the information 22e for display to the MFP 20 via the network communication device 35.

Note that the information 22e for display may be transmitted by electronic mail from the PC 30 to the MFP 20. In this case, a password for causing the MFP 20 to process the information 22e for display may be set in a subject field of the electronic mail.

Figure 5:
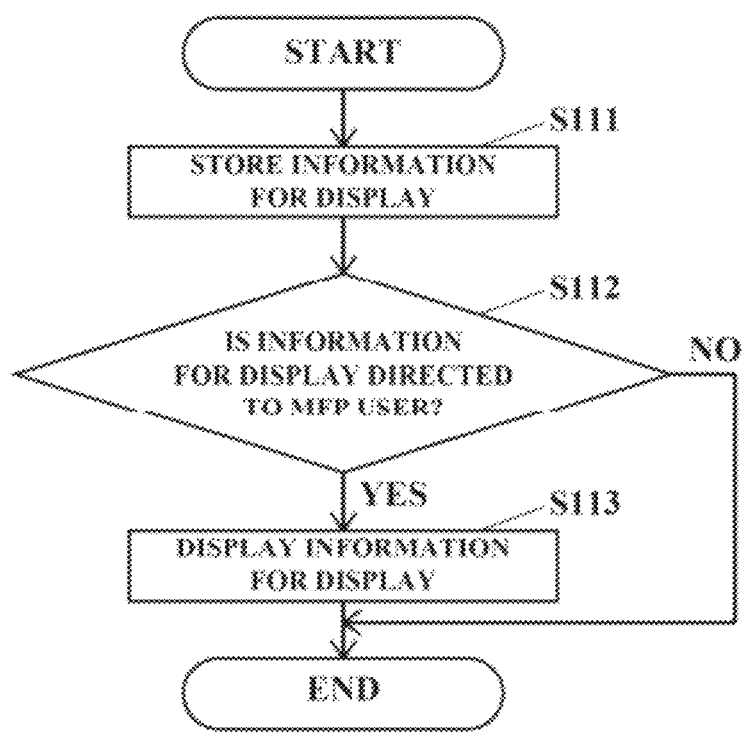
FIG. 5 is a flowchart illustrating an operation performed by the MFP when receiving information for display according to the first embodiment.

FIG. 5 is a flowchart illustrating an operation performed by the MFP 20 when receiving the information 22e for display.

The information-for-display reception unit 21b of the control device 21 of the MFP 20 performs the process illustrated in FIG. 5 when receiving the information 22e for display via the network communication device 28.

The information-for-display reception unit 21b stores the information 22e for display in the storage device 22 (S111).

The display control unit 21d of the control device 21 determines whether or not the information 22e for display stored in Step S111 is directed to the MFP user (S112). If the user information 22b associated with the information 22e for display is the user information 22b on the MFP user, that is, the user information 22b on the MFP user whose login has been received by the login reception unit 21a, the display control unit 21d determines that the information 22e for display is directed to the MFP user. On the other hand, if the user information 22b associated with the information 22e for display is not the user information 22b on the MFP user, the display control unit 21d determines that the information 22e for display is not the information directed to the MFP user.

Upon determining in Step S112 that the information 22e for display is directed to the MFP user, the display control unit 21d displays the information 22e for display stored in Step S111 on the display device 24 (S113), and brings the process illustrated in FIG. 5 to an end.

Upon determining in Step S112 that the information 22e for display is not directed to the MFP user, the display control unit 21d brings the process illustrated in FIG. 5 to an end.

In this manner, the PC user transmits the information 22e for display directed to the MFP user, and causes the MFP 20 to store the information 22e for display.

Figure 6:
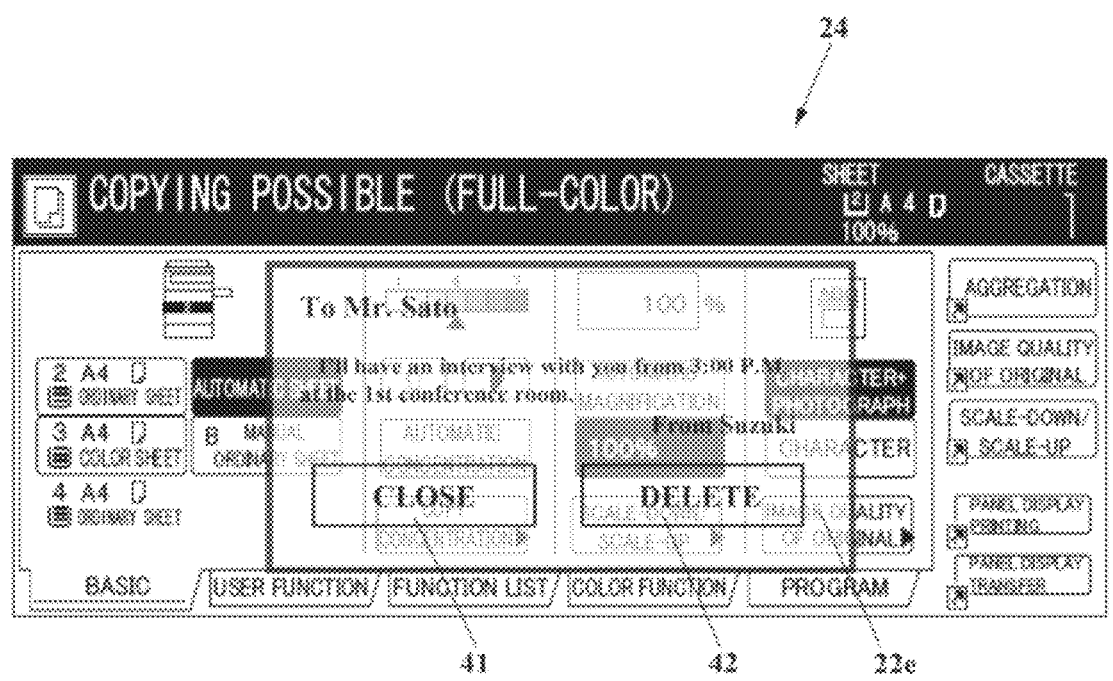
FIG. 6 is a diagram illustrating an example of the information for display that is displayed on a display device of the MFP according to the first embodiment.

FIG. 6 is a diagram illustrating an example of the information 22e for display that is displayed on the display device 24 in Step S113.

For example, the information 22e for display may be presented on a pop-up display or may be displayed in a translucent state on a screen already being displayed. The information 22e for display includes, for example, a close button 41 and a delete button 42.

If the MFP user presses the close button 41 via the operation device 23, the display control unit 21d finishes displaying the information 22e for display.

If the MFP user presses the delete button 42, the display control unit 21d finishes displaying the information 22e for display, and deletes the information 22e for display from the storage device 22. When inputting the information 22e for display via the operation device 33 of the PC 30, the PC user may specify whether or not to include the close button 41 and/or the delete button 42 in the information 22e for display.

Note that, when an instruction to delete the information 22e for display is received from the PC user via the PC 30, the control device 21 of the MFP 20 may delete the information 22e for display from the storage device 22. When a time for deletion is specified on receiving the information 22e for display, the control device 21 may delete the information 22e for display from the storage device 22 at the specified time.

Figure 7:
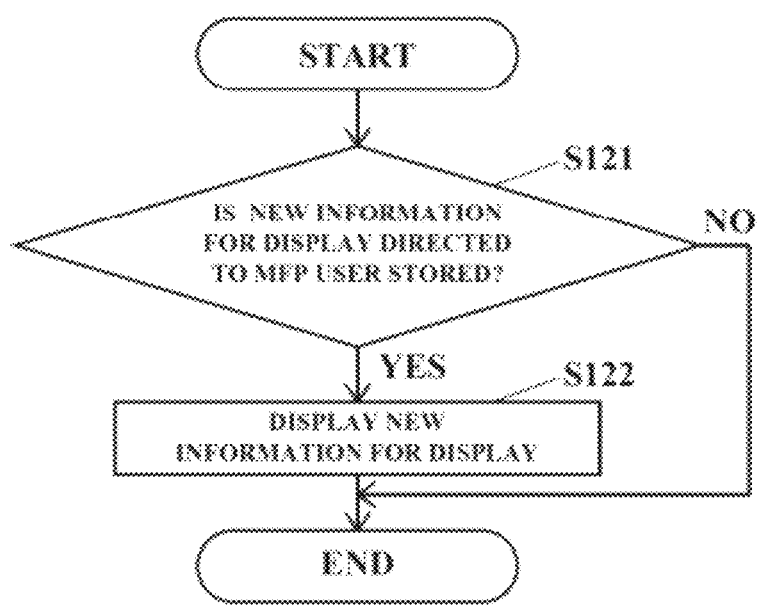
FIG. 7 is a flowchart illustrating an operation performed by the MFP when the user logs in to the MFP according to the first embodiment.

FIG. 7 is a flowchart illustrating an operation performed by the MFP 20 when the user logs in to the MFP 20.

When the user logs in to the MFP 20, the login reception unit 21a of the MFP 20 performs process illustrated in FIG. 7.

The display control unit 21d of the MFP 20 determines whether or not the new information 22e for display directed to the MFP user is stored in the storage device 22—in other words, whether or not there is information 22e for display which has not been confirmed by the MFP user (S121).

Upon determining in Step S121 that the new information 22e for display directed to the MFP user is stored, the display control unit 21d displays the new information 22e for display directed to the MFP user on the display device 24 (S122), and brings the process illustrated in FIG. 7 to an end.

Upon determining in Step S121 that the new information 22e for display directed to the MFP user is not stored, the display control unit 21d brings the process illustrated in FIG. 7 to an end without displaying any new information 22e for display.

Accordingly, the MFP 20 displays the information for display received from the PC 30 on the display device 24, and hence the PC user may convey information to the MFP user from a remote place.

Further, the MFP 20 displays the information for display on the display device 24 when the information for display received from the PC 30 is the information directed to the MFP user who has logged in, and hence the MFP 20 may display the information directed to the MFP user.

(Second Embodiment)

In the first embodiment, the PC user who has recognized the MFP user who has logged in may further input an instruction to transmit the print data 22f directed to the MFP user to the MFP 20 via the operation device 33.

When the instruction is input, the control device 31 of the PC 30 associates the user information 22b on the MFP user with the print data 22f, and then transmits the print data 22f to the MFP 20 via the network communication device 35. In this case, the control device 31 may further associate the print data 22f with the information 22e for display input via the operation device 33.

Note that the print data 22f may be transmitted by electronic mail from the PC 30 to the MFP 20. In this case, a password for causing the MFP 20 to process the print data 22f may be set in a subject field of the electronic mail.

Figure 8:
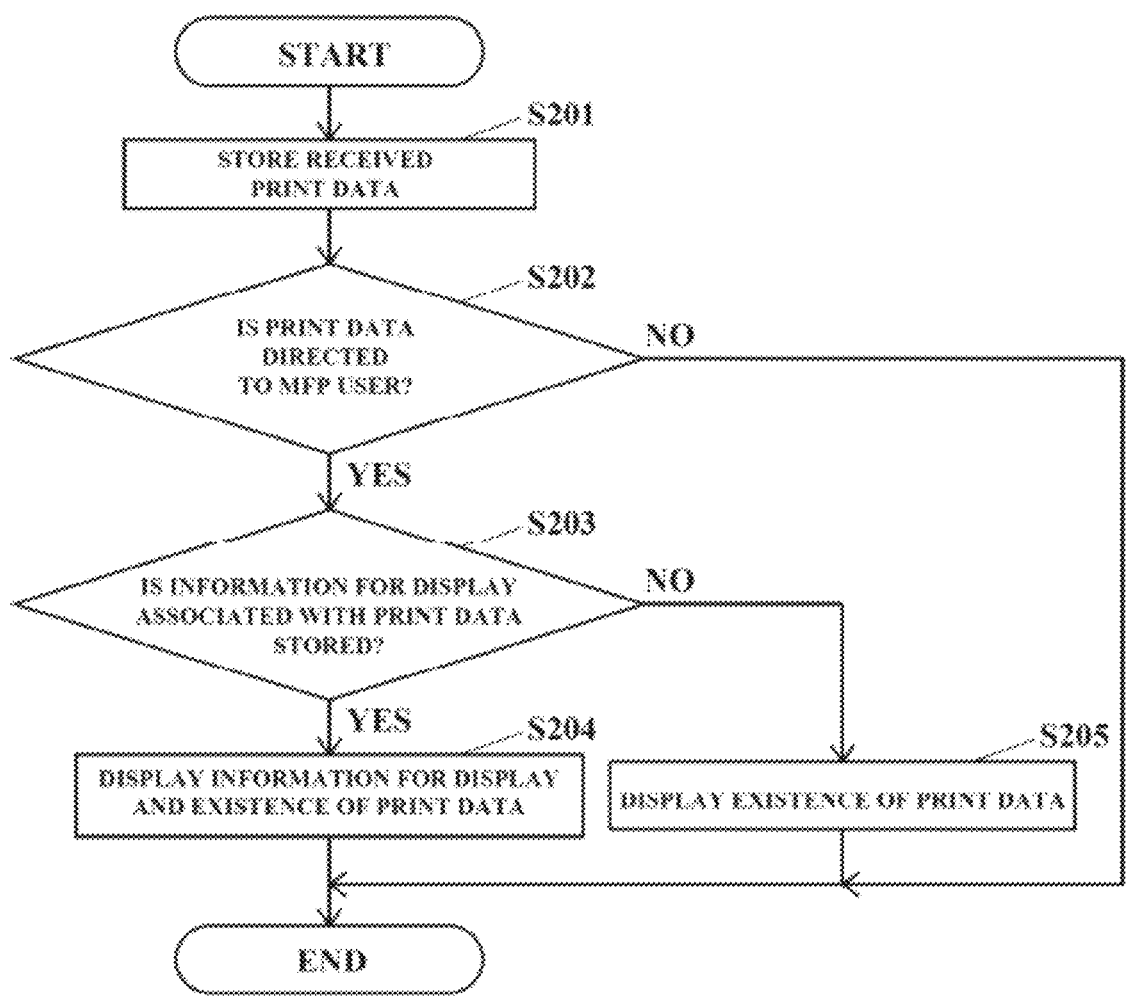
FIG. 8 is a flowchart illustrating an operation performed by the MFP when receiving print data according to a second embodiment.

FIG. 8 is a flowchart illustrating an operation performed by the MFP 20 when receiving the print data 22f.

The print data reception unit 21c of the MFP 20 performs process illustrated in FIG. 8 when receiving the print data 22f via the network communication device 28.

The print data reception unit 21c stores the received print data 22f in the storage device 22 (S201). If the information 22e for display associated with the print data 22f is received via the network communication device 28, the information-for-display reception unit 21b stores the received information 22e for display in the storage device 22.

The display control unit 21d determines whether or not the print data 22f stored in Step S201 is directed to the MFP user (S202). If the user information 22b associated with the print data 22f is the user information 22b on the MFP user, the display control unit 21d determines that the print data 22f is directed to the MFP user. On the other hand, if the user information 22b associated with the print data 22f is not the user information 22b on the MFP user, the display control unit 21d determines that the print data 22f is not directed to the MFP user.

Upon determining in Step S202 that the print data 22f is directed to the MFP user, the display control unit 21d determines whether or not the information 22e for display associated with the print data 22f is stored in the storage device 22 (S203).

Upon determining in Step S203 that the information 22e for display associated with the print data 22f is stored in the storage device 22, the display control unit 21d displays the information 22e for display on the display device 24, displays the existence of the print data 22f (S204), and brings the process illustrated in FIG. 7 to an end.

Upon determining in Step S203 that the information 22e for display associated with the print data 22f is not stored in the storage device 22, the display control unit 21d displays the existence of the print data 22f on the display device 24 (S205) and brings the process illustrated in FIG. 7 to an end.

Upon determining in Step S202 that the print data 22f is not directed to the MFP user, the display control unit 21d brings the process illustrated in FIG. 7 to an end.

Figure 9:
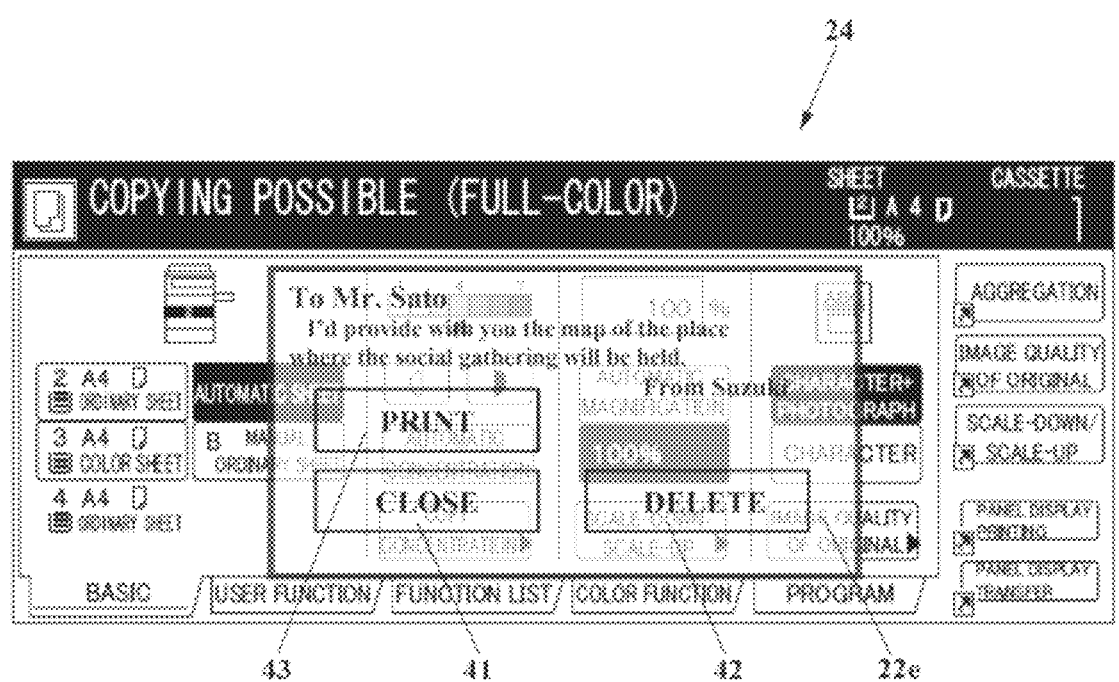
FIG. 9 is a diagram illustrating an example of the information for display that is displayed on the display device of the MFP according to the second embodiment.

FIG. 9 is a diagram illustrating an example of the information for display that is displayed on the display device 24 in Step S204.

A print button 43 associated with an instruction to print the print data 22f is displayed in the information 22e for display on the display device 24. In addition, the information 22e for display includes the close button 41 and the delete button 42. Note that the display control unit 21d may cause the display device 24 to display a preview based on the print data 22f.

If the MFP user presses the close button 41 via the operation device 23, the display control unit 21d finishes displaying the information 22e for display and the print button 43.

If the MFP user presses the delete button 42, the display control unit 21d finishes displaying the information 22e for display and the print button 43. Further, the control device 21 deletes the information 22e for display and the print data 22f associated with the information 22e for display from the storage device 22. When inputting the print data 22f via the operation device 33 of the PC 30, the PC user may specify whether or not to include the close button 41 and/or the delete button 42 in the information 22e for display.

If the MFP user presses the print button 43 via the operation device 23, the print control unit 21e causes the printer 25 to print based on the print data 22f. If there has been a print job on standby, then pressing the print button 43 may cause the printer 25 to perform the print process with a higher priority than the print job on standby. After printing the print data 22f, the display control unit 21d finishes displaying the information 22e for display and the print button 43. Further, the control device 21 deletes the information 22e for display and the print data 22f associated with the information 22e for display from the storage device 22. In this case, the information 22e for display and the print data 22f associated with the information 22e for display may be set so as not to be deleted from the storage device 22.

Note that, when the instruction to delete the information 22e for display is received from the PC user, the control device 21 of the MFP 20 may delete the print data 22f associated with the information 22e for display from the storage device 22. When the time for deletion is specified on receiving the information 22e for display, the control device 23 may delete the information 22e for display and the print data 22f associated with the information 22e for display from the storage device 22 at the specified time.

Further, when the instruction to delete the print data 22f are received from the PC user, the control device 21 of the MFP 20 may delete the print data 22f and the information 22e for display associated with the print data 22f from the storage device 22. When the time for deletion is specified on receiving the print data 22f, the control device 22e may delete the print data 22f and the information 22e for display associated with the print data 22f from the storage device 22 at the specified time.

Figure 10:
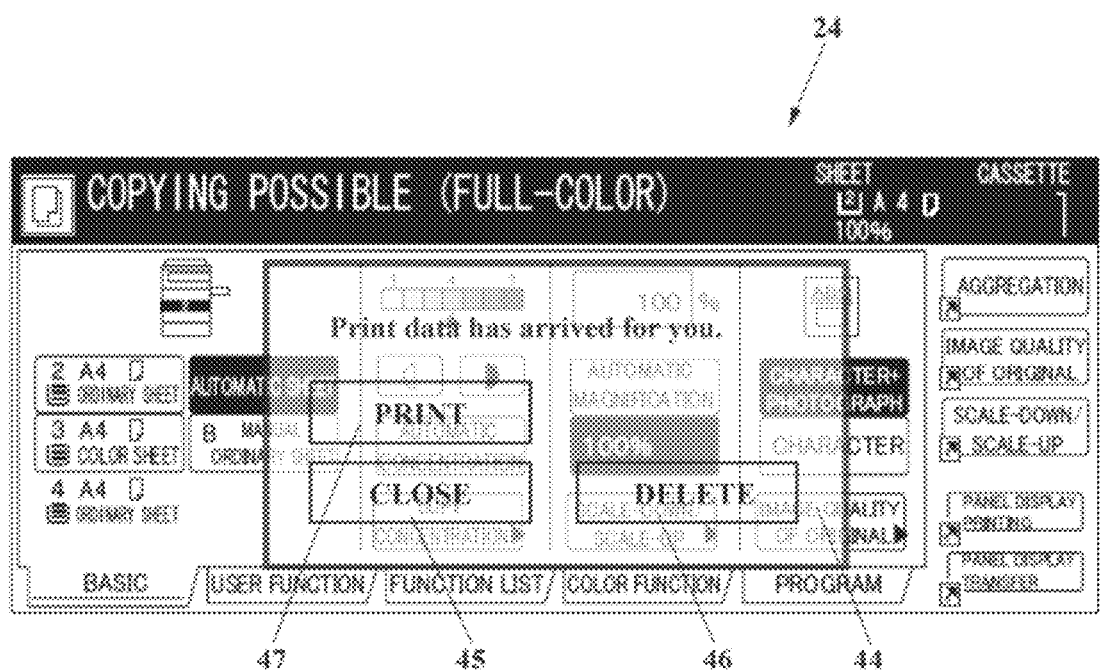
FIG. 10 is a diagram illustrating an example of the information for display that is displayed on the display device of the MFP according to the second embodiment.

FIG. 10 is a diagram illustrating an example of the information for display that is displayed on the display device 24 in Step S205.

A print button 47 for the print process based on the print data 22f and a default message 44 are displayed on the display device. The default message 44 includes a close button 45 and a delete button 46. Note that the display control unit 21d may cause the display device 24 to display the preview based on the print data 22f.

If the MFP user presses the close button 45 via the operation device 23, the display control unit 21d finishes displaying the print button 47 and the default message 44.

If the MFP user presses the delete button 46, the display control unit 21d finishes displaying the print button 47 and the default message 44. Further, the control device 21 deletes the print data 22f from the storage device 22. When inputting the print data 22f via the operation device 33, the PC user may specify whether or not to display the close button 45 and/or the delete button 46.

If the MFP user presses the print button 47, the print control unit 21e causes the printer 25 to perform the print process based on the print data 22f. When there has been a print job on standby, the print process by pressing the print button 47 may be performed with a higher priority than the print job on standby. After printing the print data 22f, the display control unit 21d finishes displaying the print button 47 and the default message 44. The control device 21 deletes the print data 22f from the storage device 22. In this case, the print data 22f may be set so as not to be deleted from the storage device 22.

Note that, when an instruction to delete the print data 22f is received from the PC user, the control device 21 of the MFP 20 may delete the print data 22f from the storage device 22. When a time for deletion is specified on receiving the print data 22f, the control device 22 may delete the print data 22f from the storage device 22 at the specified time.

Figure 11:
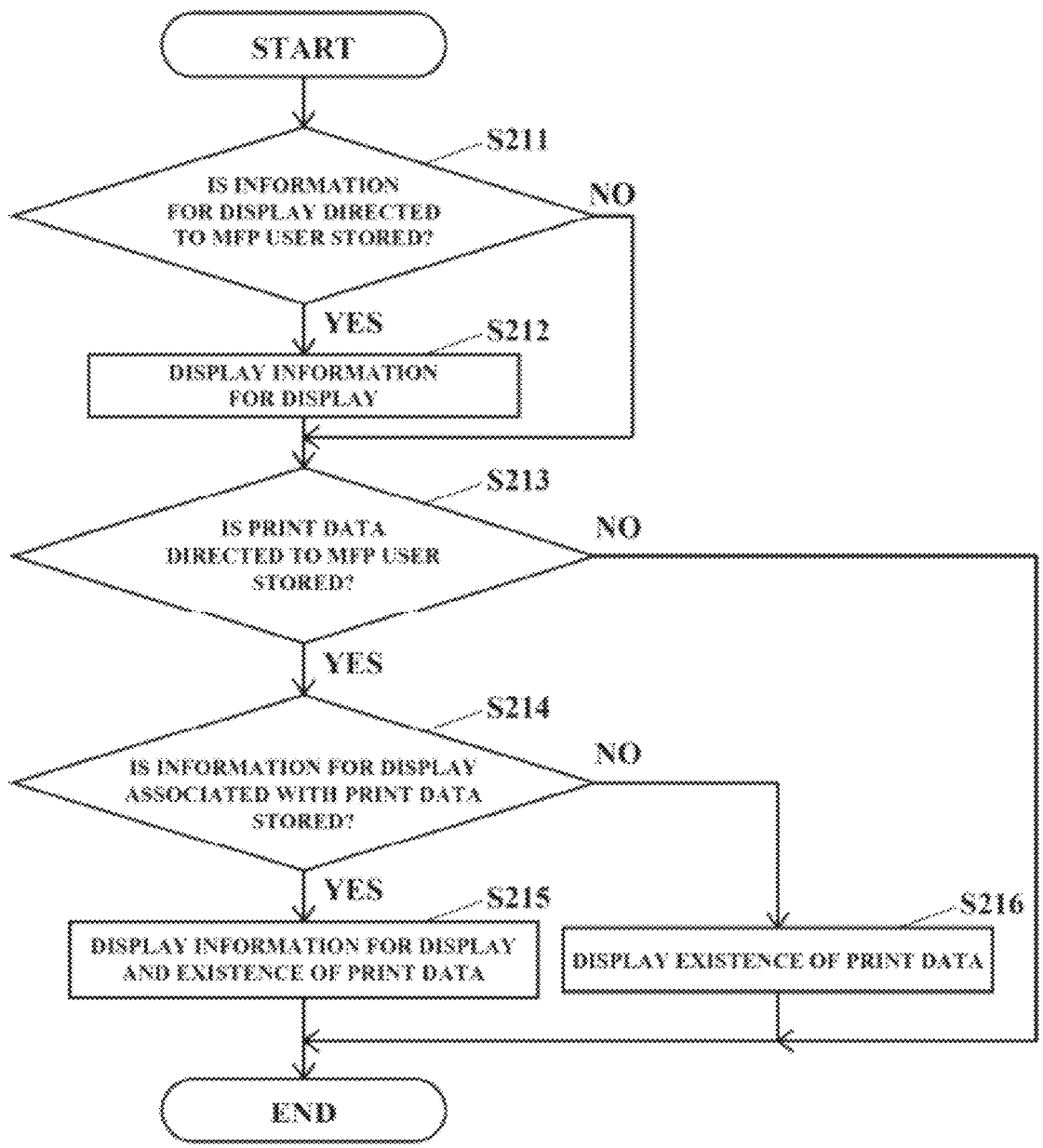
FIG. 11 is a flowchart illustrating an operation performed by the MFP when the user logs in to the MFP according to the second embodiment.

FIG. 11 is a flowchart illustrating an operation performed by the MFP 20 when the user logs in to the MFP 20.

When the user logs in to the MFP 20, the login reception unit 21a of the MFP 20 performs the process illustrated in FIG. 11

The display control unit 21d of the MFP 20 determines whether or not the information 22e for display directed to the MFP user is stored in the storage device 22 (S211). In this case, the display control unit 21d excludes the information 22e for display associated with the print data 22f from determination.

Upon determining in Step S211 that the information 22e for display directed to the MFP user is stored in the storage device 22, the display control unit 21d displays the information 22e for display on the display device 24 (S212).

Upon determining in Step S211 that the information 22e for display directed to the MFP user is not stored in the storage device 22 or after finishing the process of Step S212, the display control unit 21d determines whether or not the print data 22f directed to the MFP user is stored in the storage device 22 (S213).

Upon determining in Step S213 that the print data 22f directed to the MFP user is stored, the display control unit 21d determines whether or not the information 22e for display associated with the print data 22f directed to the MFP user is stored (S214).

Upon determining in Step S214 that the information 22e for display associated with the print data 22f directed to the MFP user is stored, the display control unit 21d displays the information 22e for display, displays existence of the print data 22f on the display device 24 (S215), and brings the process illustrated in FIG. 11 to an end.

Upon determining in Step S214 that the information 22e for display associated with the print data 22f directed to the MFP user is not stored, the display control unit 21d displays the existence of the print data 22f on the display device 24 (S216) and brings the process illustrated in FIG. 11 to an end.

Upon determining in Step S213 that no print data 22f directed to the MFP user is stored, the display control unit 21d brings the process illustrated in FIG. 11 to an end.

Accordingly, the MFP 20 displays the existence of the print data 22f on the display device 24 when the print data 22f received from the PC 30 is directed to the MFP user, and hence the MFP 20 may perform the print process based on the print data 22f directed to the MFP user.

Further, the display control unit 21d causes the display device 24 to display the print button 43 serving as the information for the print process based on the print data 22f, and thus the MFP 20 may easily instruct the MFP user to perform the print process based on the print data 22f.

(Third Embodiment)

Figure 12:
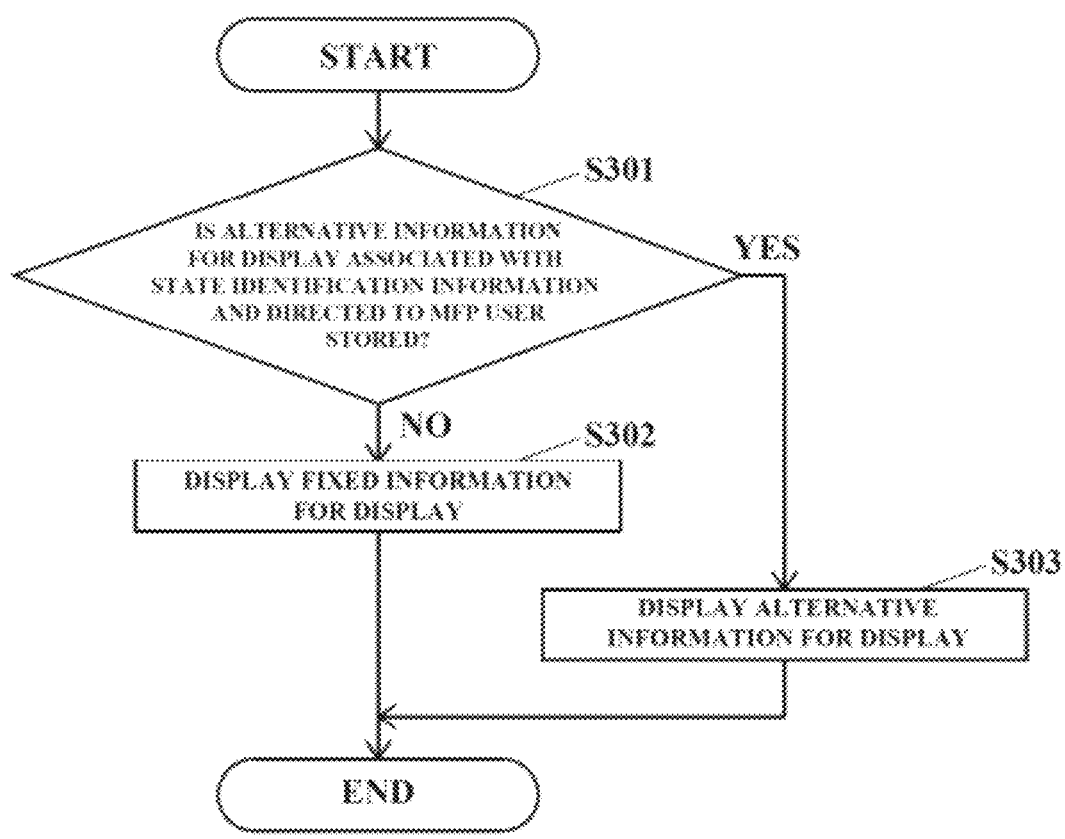
FIG. 12 is a flowchart illustrating an operation performed by the MFP when the user logs in to the MFP according to a third embodiment.

FIG. 12 is a flowchart illustrating an operation performed by the MFP when the user logs in to the MFP according to the third embodiment.

When the state occurs in which fixed information needs to be displayed—for example, when an error occurs in the MFP 20—the display control unit 21d of the MFP 20 determines whether or not alternative information for display is stored in the storage device 22 (S301). Both the fixed information for display and the alternative information for display, examples of the information 22e for display stored in the storage device 22, are associated with state identification information on the state that has occurred in the MFP 20 and directed to the MFP user.

Upon determining in Step S301 that the alternative information for display is not stored in the storage device 22, the display control unit 21d displays the fixed information for display on the display device 24 (S302), and brings the process illustrated in FIG. 12 to an end. Note that the fixed information for display may be stored in the ROM of the control device 21.

Upon determining in Step S301 that the alternative information for display is stored in the storage device 22, the display control unit 21d displays the alternative information for display on the display device 24 (S303), and brings the process illustrated in FIG. 12 to an end. Note that the alternative information for display may be updated by the PC user of the PC 30.

(Third Embodiment—Example A)

A situation may occur, for example, in which print data that cannot be processed is input, the RAM is turned to an abnormal state and an error occurs such that the MFP 20 can no longer operate. When such an error occurs, the MFP user can recover the MFP 20 from the error by restarting the MFP 20 by turning off the power supply to the MFP 20 temporarily and then turning on the power supply.

Figure 13:
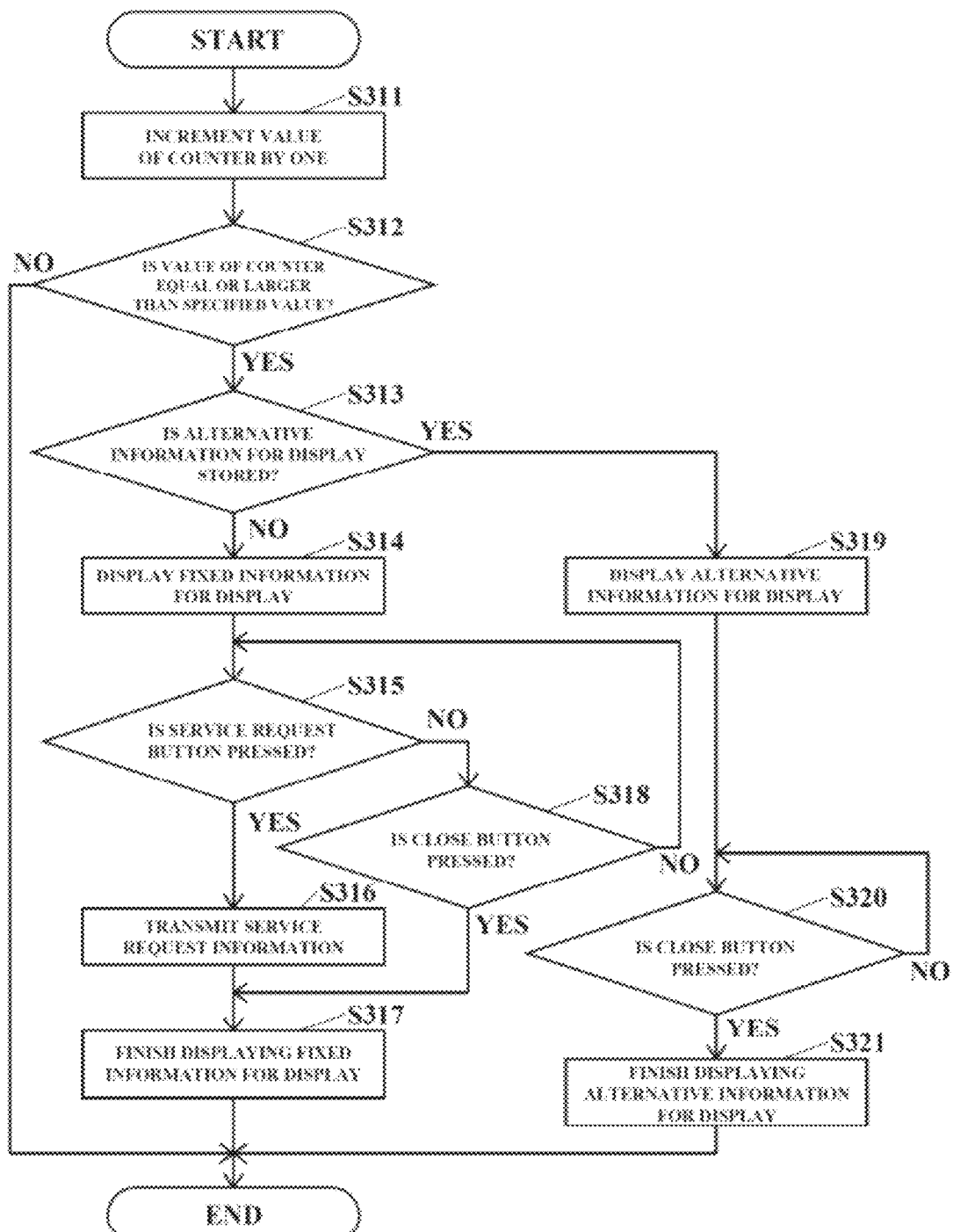
FIG. 13 is a flowchart illustrating an operation performed by the MFP according to the third embodiment (Example A)

FIG. 13 is a flowchart illustrating an operation performed by the MFP according to the third embodiment—Example A.

Each time the error occurs, the control device 21 of the MFP 20 performs the process illustrated in FIG. 13 when the MFP 20 is restarted for the first time after the error.

The display control unit 21d of the control device 21 increments a value of a counter 22g by one (S311).

The display control unit 21d determines whether or not the value of the counter 22g is equal to or larger than a specified value (S312).

Upon determining in Step S312 that the value of the counter 22g is not equal to or larger than the specified value, the display control unit 21d brings the process illustrated in FIG. 13 to an end.

On the other hand, upon determining in Step S312 that the value of the counter 22g is equal to or larger than the specified value, that is, that the error occurs a specified number of times or more, the display control unit 21d determines whether or not the alternative information for display is stored in the storage device 22 (S313).

Upon determining in Step S313 that the alternative information for display is not stored in the storage device 22, the display control unit 21d displays the fixed information for display on the display device 24 (S314).

Figure 14:
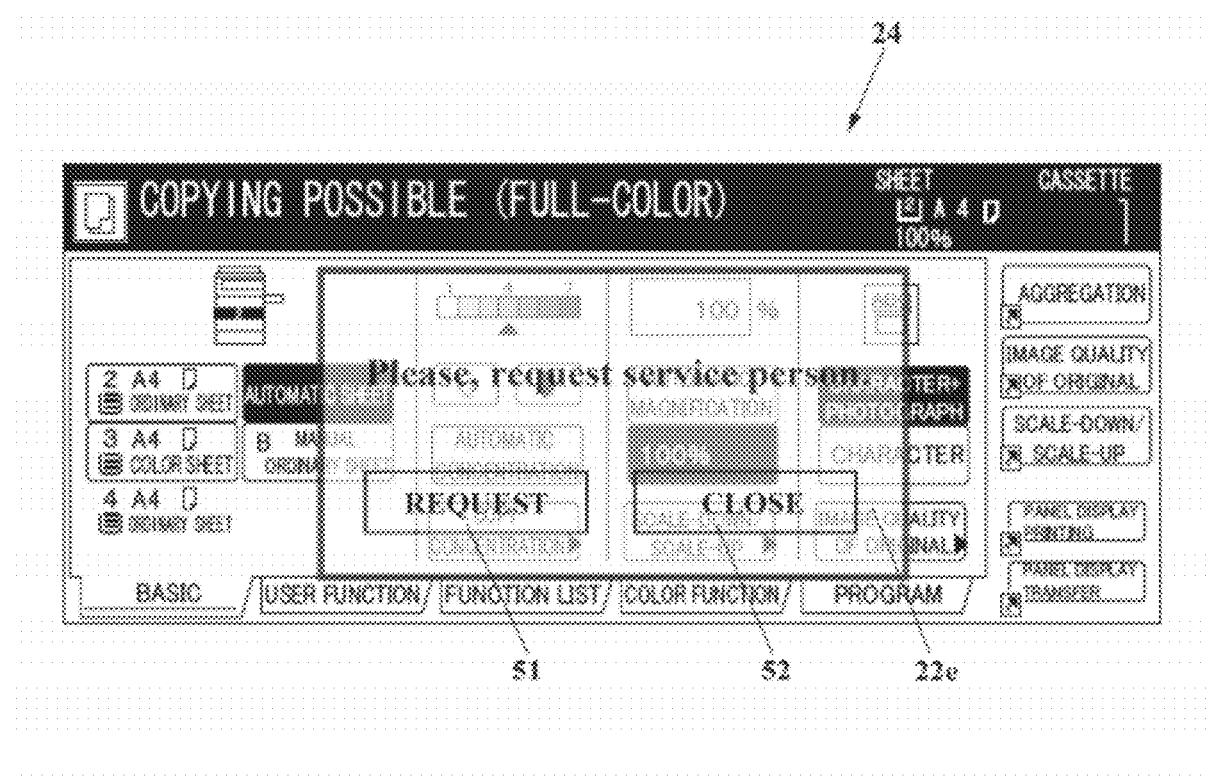
FIG. 14 is a diagram illustrating an example of fixed information for display that is displayed on the display device of the MFP according to the third embodiment (Example A)

FIG. 14 is a diagram illustrating an example of the fixed information for display that is displayed on the display device 24 in Step S314.

The fixed information for display includes a service request button 51 for requesting the service person and a close button 52 for causing the display device 24 to finish displaying the fixed information for display.

By referring again to FIG. 13, the display control unit 21d determines whether or not the service request button 51 displayed in Step S314 has been pressed via the operation device 23 (S315).

When the display control unit 21d determines in Step S315 that the service request button 51 has been pressed, the information transmission unit 21i of the control device 21 transmits the service request information, including the information for requesting the service person, to the PC 30 via the network communication device 28 (S316). Note that the transmitting of service request information from the MFP 20 to the PC 30 may be performed by electronic mail.

The display control unit 21d causes the display device 24 to finish displaying the fixed information for display (S317), and brings the process illustrated in FIG. 13 to an end.

Upon determining in Step S315 that the service request button 51 has not been pressed, the display control unit 21d determines whether or not the close button 52 has been pressed via the operation device 23 (S318).

Upon determining in Step S318 that the close button 52 has not been pressed, the display control unit 21d again returns to Step S315.

On the other hand, upon determining in Step S318 that the close button 52 has been pressed, the display control unit 21d causes the display device 24 to finish displaying the fixed information for display (S317), and brings the process illustrated in FIG. 13 to an end.

Upon determining in Step S313 that the alternative information for display is stored in the storage device 22, the display control unit 21d displays the alternative information for display on the display device 24 (S319).

Figure 15:
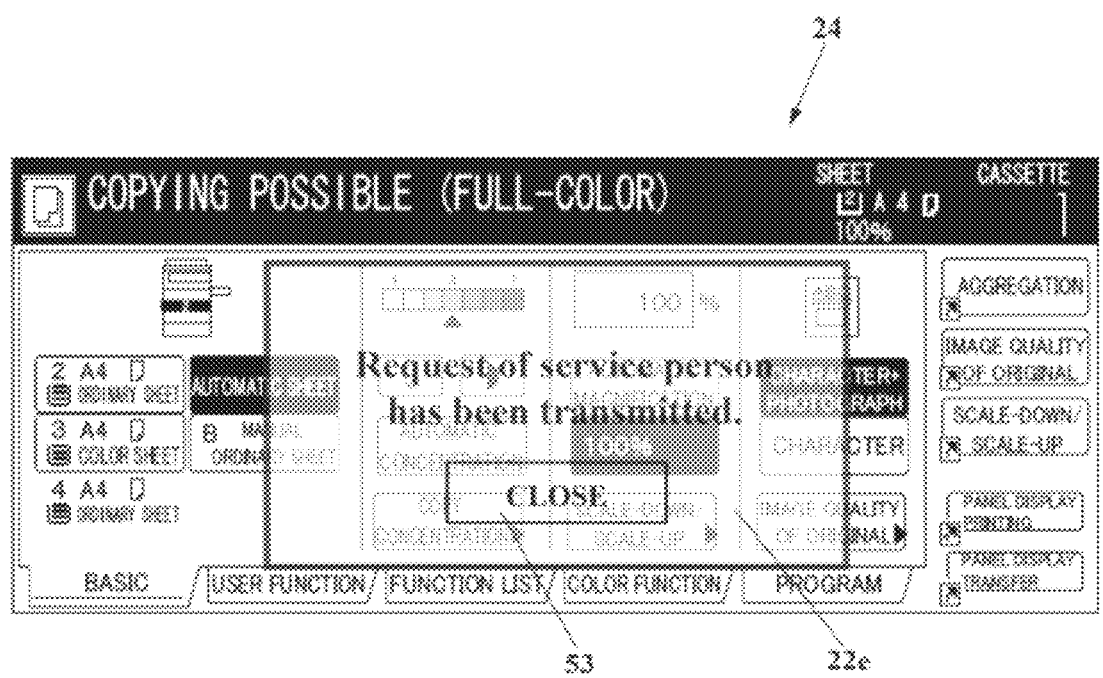
FIG. 15 is a diagram illustrating an example of alternative information for display that is displayed on the display device of the MFP according to the third embodiment (Example A)

FIG. 15 is a diagram illustrating an example of the alternative information for display that is displayed on the display device 24 in Step S319.

The alternative information for display includes information for informing the MFP user that the request of the service person has been transmitted, and further includes a close button 53 for causing the display device 24 to finish displaying the alternative information for display.

Referring again to FIG. 13, the display control unit 21d determines whether or not the close button 53 displayed in Step S319 has been pressed via the operation device 23 (S320).

Upon determining in Step S320 that the close button 53 has been pressed, the display control unit 21d causes the display device 24 to finish displaying the alternative information for display (S321), and brings the process illustrated in FIG. 13 to an end.

When receiving the service request information transmitted from the MFP 20 in Step S316 via the network communication device 35, the control device 31 of the PC 30 displays the received service request information on the display device 34.

Therefore, the PC user of the PC 30 (for example, an administrator who centrally manages a plurality of MFPs connected to the network 11) asks a manufacturer to provide the service person in response to the service request information, and then inputs the alternative information for display illustrated in FIG. 15 via the operation device 33. Note that the PC user may be the manufacturer that directly provides the service person with the MFP user.

When the alternative information for display illustrated in FIG. 15 is input, the control device 31 of the PC 30 transmits the alternative information for display to the MFP 20 via the network communication device 35. Note that the alternative information for display may be transmitted by the electronic mail from the PC 30 to the MFP 20. In this case, the password for causing the MFP 20 to process the alternative information for display may be set in the subject field of the electronic mail.

When receiving the alternative information for display via the network communication device 28, the information-for-display reception unit 21b of the control device 21 of the MFP 20 stores the received alternative information for display in the storage device 22.

Note that, when an instruction to delete the alternative information for display is received from the PC user, the control device 21 of the MFP 20 may delete the alternative information for display from the storage device 22. Further, when the time for deletion is specified on receiving the alternative information for display, the control device 21 may delete the alternative information for display from the storage device 22 at the specified time. Further, when a specified operation for deleting the alternative information for display is input by, for example, the service person via the operation device 23, the control device 21 may delete the alternative information for display from the storage device 22.

Further, when a specified operation for resetting the value of the counter 22g is input by, for example, the service person via the operation device 23, the control device 21 may reset the value of the counter 22g to zero.

Accordingly, when the alternative information for display received from the PC 30 is stored in the storage device 22, the MFP 20 causes the display device 24 to display the alternative information for display in place of the fixed information for display, which may prevent the MFP user from unnecessarily making another request for the service person.

(Third Embodiment—Example B)

When a toner amount of the MFP 20 becomes equal to or smaller than a specified value, such an event occurs that continuous copy cannot be performed while one-time copy can be performed and/or that an image density decreases.

Figure 16:
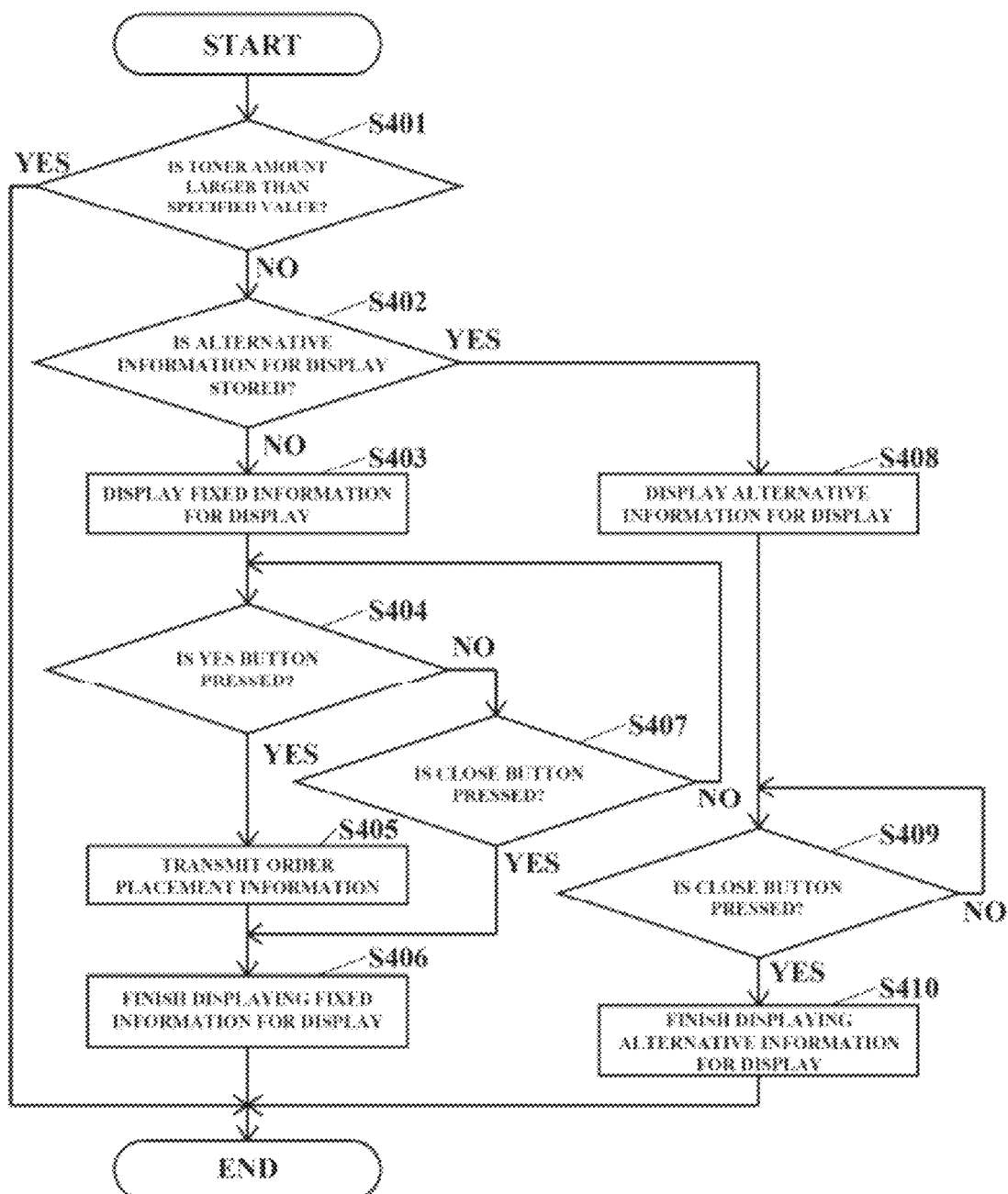
FIG. 16 is a flowchart illustrating an operation performed by the MFP according to the third embodiment (Example B)

FIG. 16 is a flowchart illustrating an operation performed by the MFP according to Example B of the third embodiment.

The control device 21 of the MFP 20 performs process illustrated in FIG. 16 when a sensor (not illustrated) detects that the toner amount has become equal to or smaller than the specified value. Note that, for example, the sensor may be a toner sensor that detects a remaining amount of toner based on a magnetic resistance of a developer including toner.

The display control unit 21d determines via the sensor whether or not the toner amount is larger than the specified value (S401).

Upon determining in Step S401 that the toner amount is larger than the specified value, the display control unit 21d brings the process illustrated in FIG. 16 to an end.

On the other hand, upon determining in Step S401 that the toner amount is equal to or smaller than the specified value, the display control unit 21d determines whether or not the alternative information for display is stored in the storage device 22 (S402).

Upon determining in Step S402 that the alternative information for display is not stored in the storage device 22, the display control unit 21d displays the fixed information for display on the display device 24 (S403).

Figure 17:
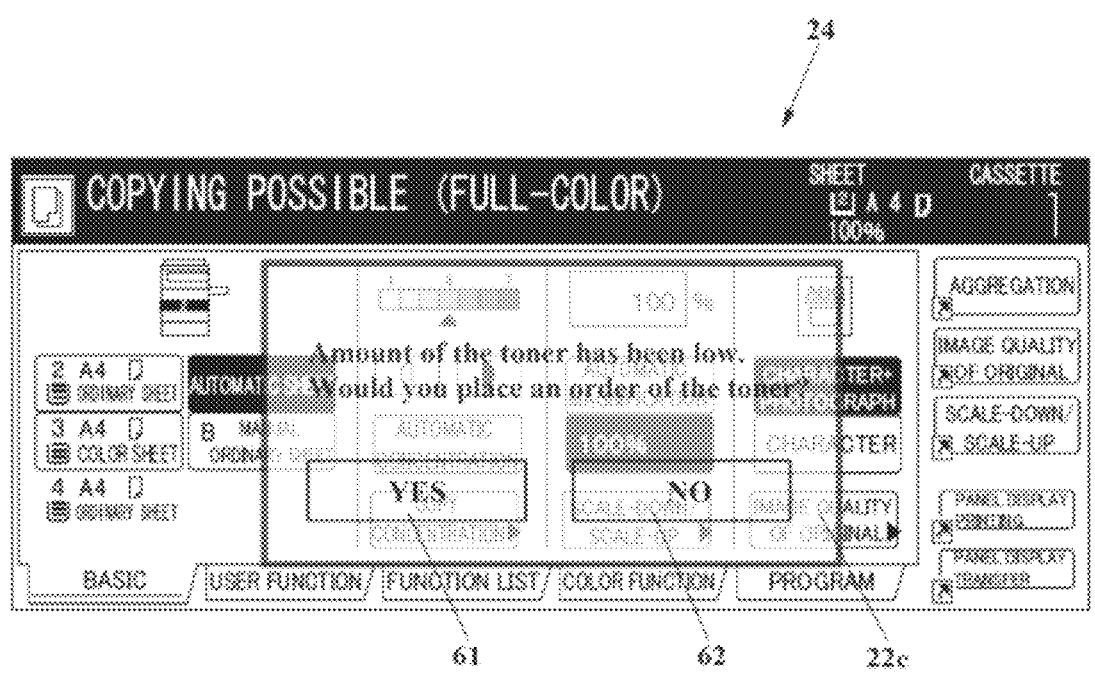
FIG. 17 is a diagram illustrating an example of the information for display that is displayed on the display device of the MFP according to the third embodiment (Example B)

FIG. 17 is a diagram illustrating an example of the fixed information for display that is displayed on the display device 24 in Step S403.

The fixed information for display includes a YES button 61 for placing an order for the toner and a NO button 62 for causing the display device 24 to finish displaying the fixed information for display.

By referring again to FIG. 16, the display control unit 21d determines whether or not the YES button 61 displayed in Step S403 has been pressed via the operation device 23 (S404).

When the display control unit 21d determines in Step S404 that the YES button 61 has been pressed, the information transmission unit 21i of the control device 21 transmits the order placement information, including information for placing the order for the toner, to the PC 30 via the network communication device 28 (S405). Note that the order placement information may be transmitted from the MFP 20 to the PC 30 by electronic mail.

The display control unit 21d causes the display device 24 to finish displaying the fixed information for display (S406), and brings the process illustrated in FIG. 16 to an end.

Upon determining in Step S404 that the YES button 61 has not been pressed, the display control unit 21d determines whether or not the NO button 62 has been pressed via the operation device 23 (S407).

Upon determining in Step S407 that the NO button 62 has not been pressed, the display control unit 21d again returns to Step S404.

On the other hand, upon determining in Step S407 that the NO button 62 has been pressed, the display control unit 21d causes the display device 24 to finish displaying the fixed information for display (S406), and brings the process illustrated in FIG. 16 to an end.

Upon determining in Step S402 that the alternative information for display is stored in the storage device 22, the display control unit 21*d* displays the alternative information for display on the display device 24 (S408).

Figure 18:
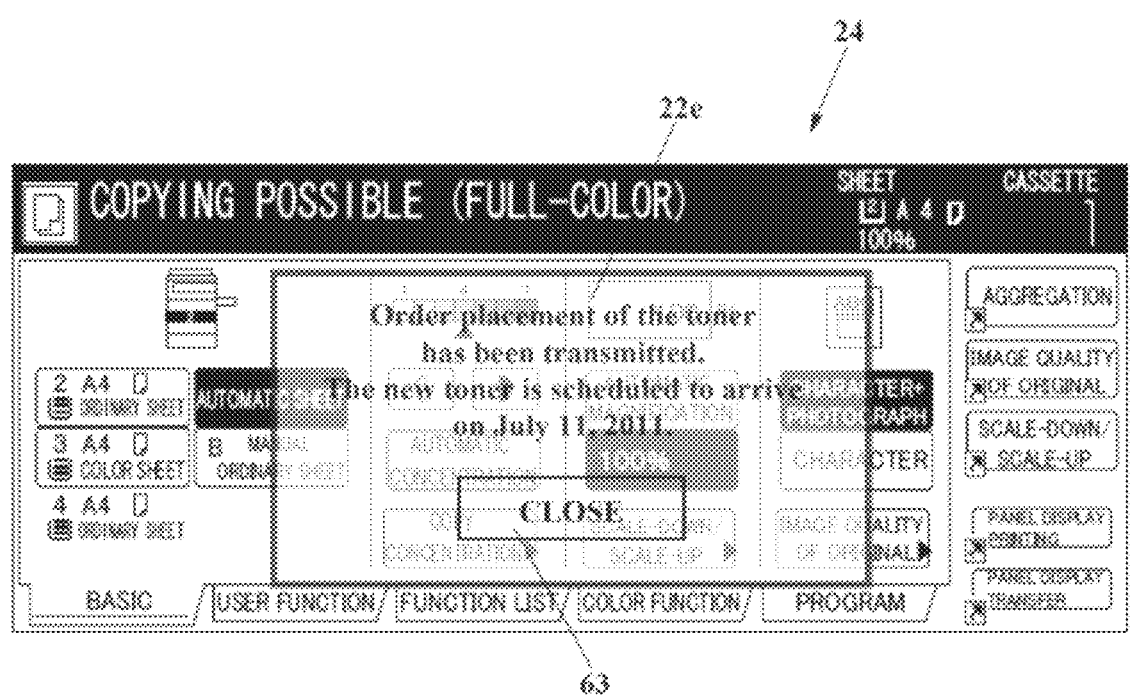
FIG. 18 is a diagram illustrating an example of the information for display that is displayed on the display device of the MFP according to the third embodiment (Example B)

FIG. 18 is a diagram illustrating an example of the alternative information for display that is displayed on the display device 24 in Step S408.

The alternative information for display includes information for informing the MFP user of at least one of: the fact that the placed order of the toner has been transmitted; and a scheduled arrival date of the toner whose order has been placed, and further includes a close button 63 for causing the display device 24 to finish displaying the alternative information for display.

By referring again to FIG. 16, the display control unit 21*d* determines whether or not the close button 63 displayed in Step S408 has been pressed via the operation device 23 (S409).

Upon determining in Step S409 that the close button 63 has been pressed, the display control unit 21*d* causes the display device 24 to finish displaying the alternative information for display (S410), and brings the process illustrated in FIG. 16 to an end.

When receiving the order placement information transmitted from the MFP 20 in Step S405 via the network communication device 35, the control device 31 of the PC 30 displays the received order placement information on the display device 34.

Therefore, the PC user of the PC 30 (for example, an administrator who centrally manages a plurality of MFPs connected to the network 11) places an order with a manufacturer for the toner in response to the order placement information, and then inputs the alternative information for display illustrated in FIG. 18 via the operation device 33. Note that the PC user may be the manufacturer that directly provides the MFP user with the toner.

When the alternative information for display is input, the control device 31 of the PC 30 transmits the input alternative information for display to the MFP 20 via the network communication device 35. Note that the alternative information for display may be transmitted from the PC 30 to the MFP 20 by electronic mail. In the case of transmission by electronic mail, the password for causing the MFP 20 to process the alternative information for display may be set in the subject field of the electronic mail.

When receiving the alternative information for display via the network communication device 28, the information-for-display reception unit 21*b* of the control device 21 of the MFP 20 stores the received alternative information for display in the storage device 22.

Note that, when an instruction to delete the alternative information for display is received from the PC user, the control device 21 of the MFP 20 may delete the alternative information for display from the storage device 22. Further, when the time for deletion is specified on receiving the alternative information for display, the control device 21 may delete the alternative information for display from the storage device 22 at the specified time. Further, when the specified operation for deleting the alternative information for display is input via the operation device 23, the control device 21 may delete the alternative information for display from the storage device 22.

Note that, if the scheduled arrival date is changed, the PC user may input new alternative information for display for informing of the change of the scheduled arrival date via the operation device 33, and transmit the new alternative information for display to the MFP 20.

In this case, when the instruction is input, the control device 31 of the PC 30 transmits the new alternative information for display to the MFP 20 via the network communication device 35.

When receiving the new alternative information for display via the network communication device 28, the information-for-display reception unit 21*b* stores the new alternative information for display in the storage device 22 in place of the already-stored alternative information for display. Further, the display control unit 21*d* displays the new alternative information for display on the display device 24. That is, the display control unit 21*d* updates the alternative information for display on the display device 24 to the new alternative information for display.

Figure 19:
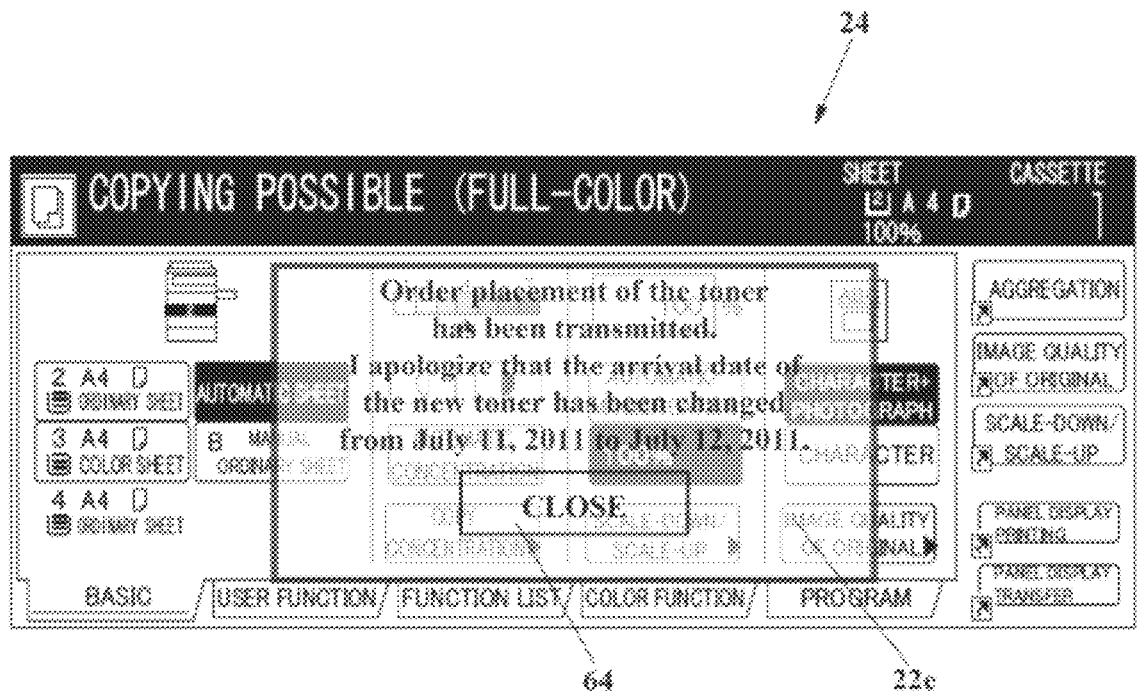
FIG. 19 is a diagram illustrating another example of the information for display that is displayed on the display device of the MFP according to the third embodiment (Example B)

FIG. 19 is a diagram illustrating an example of new alternative information for display that is displayed on the display device 24.

The new alternative information for display includes information for informing the MFP user of the change of the scheduled arrival date of the toner whose order has been placed, and further includes a close button 64 for causing the display device 24 to finish displaying the new alternative information for display.

When the MFP user presses the close button 64 via the operation device 23, the display control unit 21*d* causes the display device 24 to finish displaying the new alternative information for display.

Note that, while the toner is an example of the consumable in Example B of the third embodiment, for example, parts including paper, rollers, and gears, may be applied.

Accordingly, when the alternative information for display received from the PC 30 is stored in the storage device 22, the MFP 20 causes the display device 24 to display the alternative information for display in place of the fixed information for display, which may prevent the MFP user from unnecessarily placing another order for the toner.

(Fourth Embodiment)

In the first embodiment, the control device 21 of the MFP 20 further functions as (i) the information-for-display input unit 21*g* via which the information 22*e* for display is input and (ii) the web page creation unit 21*h* that creates the web page including the information 22*e* for display input via the information-for-display input unit 21*g* in response to the request from the web browser 31*a* of the PCs 30 and/or 40.

When a request for access to the MFP 20 is input by the PC user via the operation device 33, the web browser 31*a* of the PC 30 displays the web page for login stored in the storage device 22 of the MFP 20 on the display device 34.

Then, when the user information 22*b* on the PC user and the password 22*c* is input via the operation device 33, the web browser 31*a* transmits the user information 22*b* and the password 22*c* to the MFP 20 via the network communication device 35.

The login reception unit 21*a* of the MFP 20 receives the user information 22*b* and the password 22*c* via the network communication device 28. The control device 21 performs authentication and transmits success in the login to the web browser 31*a* of the PC 30 via the network communication device 28.

When the information 22*e* for display on the web browser of the PCs 30 and/or 40 is input via the operation device 33, the web browser 31*a* transmits the input information 22*e* for display to the MFP 20 via the network communication device 35.

Figure 20:
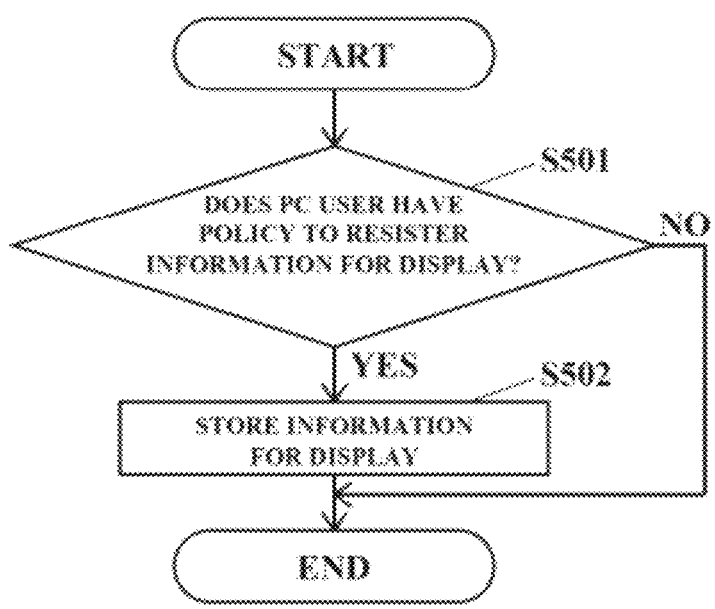
FIG. 20 is a flowchart illustrating an operation performed by the MFP when registering the information for display according to a fourth embodiment.

When receiving the information 22e for display via the network communication device 28, the information-for-display input unit 21g of the MFP 20 performs the process illustrated in FIG. 20.

FIG. 20 is a flowchart illustrating an operation performed by the MFP 20 when registering the information 22e for display.

The information-for-display input unit 21g determines based on the policy information 22d stored in the storage device 22 whether or not the PC user who has logged in via the web browser 31a has a policy to register the information 22e for display (S501).

Upon determining in Step S501 that the PC user has the policy to register the information 22e for display, the information-for-display input unit 21g causes the storage device 22 to store the information 22e for display (S502), and brings the process illustrated in FIG. 20 to an end.

Upon determining in Step S501 that the PC user does not have the policy to register the information 22e for display, the information-for-display input unit 21g does not cause the storage device 22 to store the information 22e for display, and brings the process illustrated in FIG. 20 to an end.

Note that the web browser 31a of the PC 30 may cause the information 22e for display to be input via the operation device 33 in association with the user information 22b.

Further, the MFP 20 may store the information 22e for display input from the PC 40 as well as from the PC 30.

Additionally, the MFP 20 may store the information 22e for display input from other MFPs as well as from the PCs 30 and/or 40.

When receiving the success in the login from the MFP 20, the web browser of the PC 30 may send a request to the MFP 20 for the setting information and/or the state information.

Figure 21:
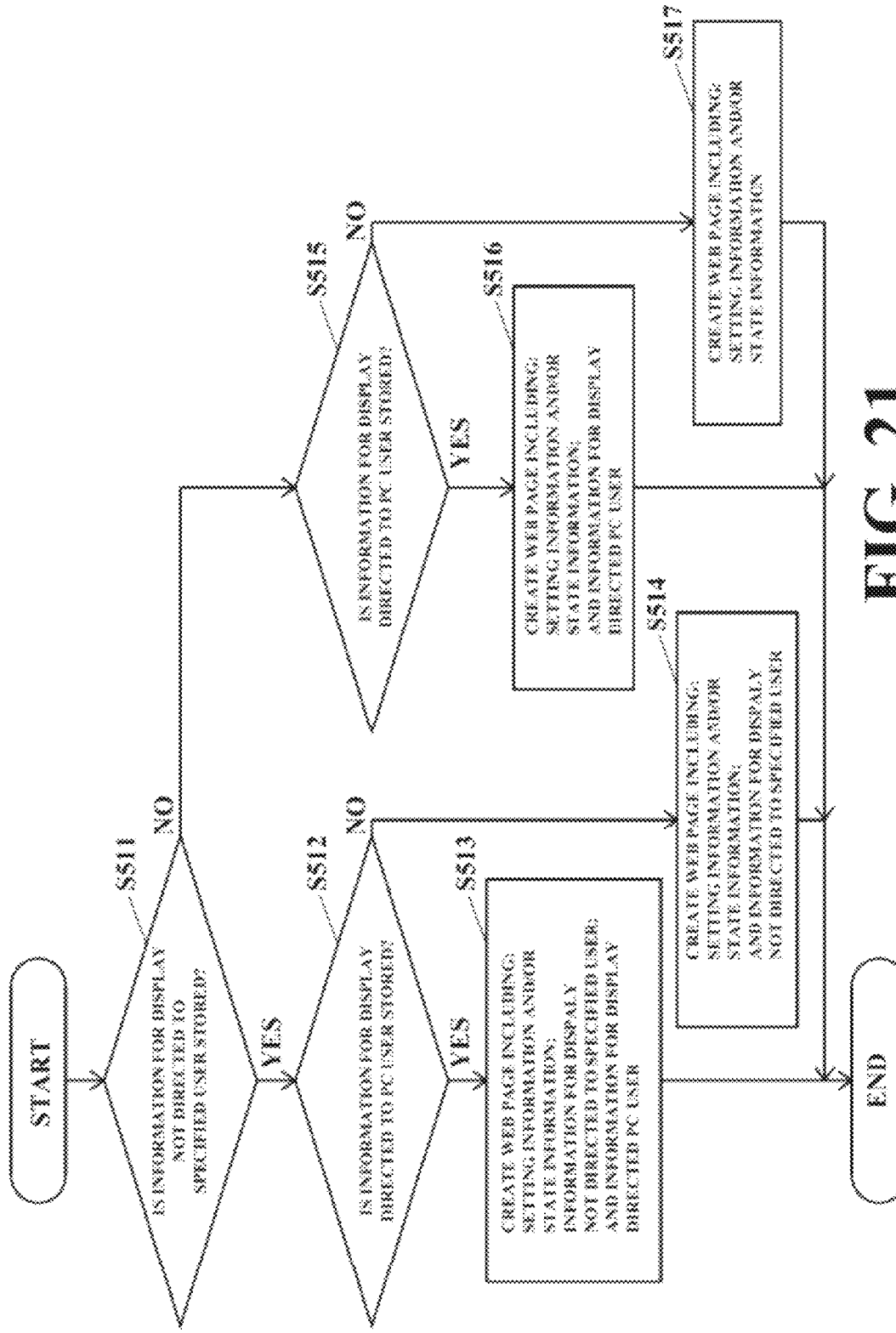
FIG. 21 is a flowchart illustrating an operation performed by the MFP when creating a web page including the information for display according to the fourth embodiment.

When a request for the setting information and/or the state information is received from the web browser 31a of the PC 30, the web page creation unit 21h of the MFP 20 performs process illustrated in FIG. 21.

Note that the setting information includes information set in the MFP 20, such as the paper size of the tray of the MFP 20. The state information includes information indicating the state of the MFP 20, such as the state during the print process.

FIG. 21 is a flowchart illustrating an operation performed by the MFP 20 when creating a web page including the information 22e for display.

The web page creation unit 21h determines whether or not the information 22e for display not directed to the specified user is stored in the storage device 22 (S511).

Upon determining that the information 22e for display not directed to the specified user is stored, the web page creation unit 21h determines whether or not the information 22e for display directed to the PC user who has logged in via the web browser that has requested the setting information and/or the state information is stored in the storage device 22 (S512).

Upon determining that the information 22e for display directed to the PC user is stored, the web page creation unit 21h creates a web page including: the setting information and/or the state information; and the information 22e for display not directed to the specified user and the information 22e for display directed to the PC user (S513), and brings the process illustrated in FIG. 21 to an end. Therefore, the web browser 31a displays the web page including: the setting information and/or the state information; the information 22e for display not directed to the specified user; and the information 22e for display directed to the PC user, on the display device 24 of the PC 30.

Upon determining in Step S512 that the information 22e for display directed to the PC user is not stored, the web page creation unit 21h creates a web page including: the setting information and/or the state information; and the information 22e for display not directed to the specified user (S514), and brings the process illustrated in FIG. 21 to an end. Therefore, the web browser 31a displays the web page including: the setting information and/or the state information; and the information 22e for display not directed to the specified user.

Upon determining in Step S511 that the information 22e for display not directed to the specified user is not stored, the web page creation unit 21h determines whether or not the information 22e for display directed to the PC user is stored in the storage device 22 (S515).

Upon determining that the information 22e for display directed to the PC user is stored, the web page creation unit 21h creates a web page including: the setting information and/or the state information; and the information 22e for display directed to the PC user (S516), and brings the process illustrated in FIG. 21 to an end. Therefore, the web browser 31a may display the web page including: the setting information and/or the state information; and the information 22e for display directed to the PC user.

Upon determining in Step S515 that the information 22e for display directed to the PC user is not stored, the web page creation unit 21h creates a web page including the setting information and/or the state information (S517), and brings the process illustrated in FIG. 21 to an end. Therefore, the web browser 31a displays the web page including the setting information and/or the state information.

Note that the MFP 20 may display the web page including the information 22e for display on the web browser of the PC 40 as well as on the web browser 31a of the PC 30.

Further, the MFP 20 may display the web page including the information 22e for display on the web browsers of other MFPs as well as on the web browsers of the PCs 30 and/or 40.

Accordingly, when the request received from the web browser of the external device such as the PC 30 or 40 is from the user who has logged in via the web browser, the MFP 20 creates the web page including the information 22e for display directed to the PC user, and hence may cause the web browser of the external device to display the information 22e for display directed to the PC user and cause the PC user to visually recognize the information 22e for display.

It should be understood that various changes and modifications to the embodiments described herein will be apparent to those skilled in the art. Such changes and modifications may be made without departing from the spirit and scope of the present subject matter and without diminishing its intended advantages. It is therefore intended that such changes and modifications be covered by the appended claims.

The invention claimed is:

1. An image forming apparatus, comprising:
a display device configured to display information for display;
an operation device configured to receive input of an operation from a user;
a storage device that stores the information for display,
an information-for-display reception unit configured to (a) receive the information for display from an external device, (b) cause the storage device to store the information for display, (c) receive alternative information for display that is associated with the state identification information, and (d) cause the storage device to store the alternative information for display; and
a display control unit configured to (a) control the display device, (b) cause the display device to display the information for display, when the information for display received by the information-for-display reception unit is directed to the user, (c) cause the display device to display the information for display stored in the storage device, (d) cause the display device to display fixed information for display that is stored in the storage device and is associated with state identification information on a state that has occurred in the image forming apparatus, on the display device, (e) determine whether or not the alternative information for display is stored in the storage device, (f) cause the display device to display the alternative information for display when determining that the alternative information for display is stored, and (g) cause the display device to display the fixed information for display when determining that the alternative information for display is not stored.

2. The image forming apparatus according to claim 1, further comprising a login reception unit configured to receive login of the user,
wherein the display control unit is further configured to cause the display device to display the information for display, when the identification information associated with the information for display received by the information-for-display reception unit matches the identification information received by the login reception unit.

3. The image forming apparatus according to claim 2, further comprising an identification information transmission unit configured to transmit the identification information received by the login reception unit to the external device,
wherein the external device is configured to transmit, when receiving the identification information, the information for display associated with the identification information to the information-for-display reception unit.

4. The image forming apparatus according to claim 2, further comprising:
a printer configured to perform a print process based on print data;
a print data reception unit configured to receive the print data from the external device; and
a print control unit configured to control the printer, wherein:
the display control unit is further configured to cause the display device to display existence of the print data, when identification information associated with the print data received by the print data reception unit matches the identification information received by the login reception unit; and
the print control unit is further configured to cause the printer to perform the print process by an instruction via the operation device.

5. The image forming apparatus according to claim 4, wherein the display control unit is further configured to cause the display device to display information for an operation for inputting the instruction.

6. The image forming apparatus according to claim 1, wherein:
the fixed information for display includes information for causing the user to request for a service person; and
the display control unit is further configured to cause the display device to display the fixed information for display when a specified error occurs in the image forming apparatus.

7. The image forming apparatus according to claim 6, further comprising an information transmission unit configured to transmit service request information that includes a request for the service person to the external device,
wherein the information transmission unit is further configured to transmit the service request information by an instruction in the fixed information for display via the operation device.

8. The image forming apparatus according to claim 6, wherein the specified error includes that a specified malfunction that is recovered by restarting the image forming apparatus occurs a specified number of times or more.

9. The image forming apparatus according to claim 6, wherein the alternative information for display includes information for informing the user that the request for the service person has been transmitted.

10. The image forming apparatus according to claim 1, wherein:
the fixed information for display includes information for causing the user to place an order of a consumable in the image forming apparatus; and
the display control unit is further configured to cause the display device to display the fixed information for display when an amount of the consumable is equal to or smaller than a specified value.

11. The image forming apparatus according to claim 10, further comprising an information transmission unit configured to transmit order placement information that includes an order placement of the consumable to the external device,
wherein the information transmission unit further configured to transmit the order placement information to the external device by an instruction in the fixed information for display via the operation device.

12. The image forming apparatus according to claim 10, wherein the alternative information for display includes information for informing the user that the order placement of the consumable has been transmitted.

13. The image forming apparatus according to claim 10, wherein the alternative information for display includes information for informing the user of a scheduled arrival date of the consumable.

14. The image forming apparatus according to claim 10, wherein:
the display control unit is further configured to update the alternative information for display to new alternative information for display; and
the new alternative information includes information for informing the user of the change of the scheduled arrival date of the consumable.

15. The image forming apparatus according to claim 1, wherein the display control unit is further configured to update the alternative information for display to new alternative information for display.

16. The image forming apparatus according to claim 1, further comprising:
an information-for-display input unit configured to input the information for display that is displayed on a web browser of the external device; and
a web page creation unit configured to create a web page including the input information for display in response to a request received from the web browser.

17. The image forming apparatus according to claim 16, wherein the web page creation unit is further configured to create the web page including the information for display with at least one of setting information on the image forming apparatus and state information on the image forming apparatus.

18. The image forming apparatus according to claim 16, further comprising a login reception unit configured to receive login of the user via the web browser, wherein the web page creation unit is further configured to create the web page including the information for display associated with identification information received by the login reception unit, when identification information associated with the request received from the web browser matches the identification information received by the login reception unit.

\* \* \* \* \*